(12) United States Patent
Arora (10) Patent No.: US 8,432,813 B2
(45) Date of Patent: Apr. 30, 2013

(54) MICROWAVE RADIO COMMUNICATIONS DEVICE AND RELATED METHOD OF OPERATION AND NETWORK ARRANGEMENT

(75) Inventor: Prince Arora, Reading (GB)

(73) Assignee: NEC Corporation, Tokyo (JP)

( * ) Notice: Subject to any disclaimer, the term of this patent is extended or adjusted under 35 U.S.C. 154(b) by 158 days.

(21) Appl. No.: 12/736,892

(22) PCT Filed: May 22, 2009

(86) PCT No.: PCT/JP2009/059828
§ 371 (c)(1),
(2), (4) Date: Nov. 19, 2010

(87) PCT Pub. No.: WO2009/142336
PCT Pub. Date: Nov. 26, 2009

(65) Prior Publication Data
US 2011/0075597 A1 Mar. 31, 2011

(30) Foreign Application Priority Data
May 23, 2008 (GB) .................................. 0809402.1

(51) Int. Cl.
*H04L 12/26* (2006.01)
(52) U.S. Cl.
USPC ........................................................ 370/236
(58) Field of Classification Search .................. 370/310, 370/351, 389, 392, 393, 229–231, 235, 236, 370/241, 252; 455/403, 422.1, 39, 500, 507, 455/517
See application file for complete search history.

(56) References Cited

U.S. PATENT DOCUMENTS

| 7,577,438 | B2 | 8/2009 | Sammour et al. | |
|---|---|---|---|---|
| 2004/0022225 | A1* | 2/2004 | Liang et al. | 370/338 |
| 2006/0176882 | A1* | 8/2006 | Schein et al. | 370/395.32 |
| 2008/0212513 | A1* | 9/2008 | Tao et al. | 370/315 |
| 2008/0285501 | A1* | 11/2008 | Zhang et al. | 370/315 |
| 2009/0092071 | A1* | 4/2009 | Mohanty | 370/312 |
| 2009/0092076 | A1* | 4/2009 | Zheng et al. | 370/328 |
| 2009/0312021 | A1* | 12/2009 | Kim | 455/436 |
| 2012/0076033 | A1* | 3/2012 | Mundarath et al. | 370/252 |

FOREIGN PATENT DOCUMENTS
WO WO 2006/115999 A2 11/2006

OTHER PUBLICATIONS
Coordinated association during scanning. IEEE C802.16e-05/143r8, May 4, 2005, pp. 1-15.

* cited by examiner

*Primary Examiner* — Omar Ghowrwal
(74) *Attorney, Agent, or Firm* — McGinn IP Law Group, PLLC (57) ABSTRACT

The present invention provides for a microwave radio communications user device arranged for communication with a base station and for receiving and decoding an MPDU for use in initial ranging signalling with said base station, the device being further arranged to retrieve data in a downlink-subframe from the base station serving to discriminate between MPDUs intended for different user devices.

19 Claims, 9 Drawing Sheets

MICROWAVE RADIO COMMUNICATIONS DEVICE AND RELATED METHOD OF OPERATION AND NETWORK ARRANGEMENT

TECHNICAL FIELD

The present invention relates to a microwave radio communications device and related method of operation and network arrangement.

BACKGROUND ART

Microwave communication devices such as, for example, WiMAX Customer Premises Equipment (CPE), WiMAX Subscriber Stations (SS) and WiMAX Mobile Stations (MS) are well known elements of a WiMAX communication system. Such devices are arranged to communicate with a WiMAX base station and offer wireless microwave connectivity over distances far in excess of that exhibited by WiFi systems.

Various signalling scenarios arise such as when a user first switches on the WiMAX device, or when such device performs a handover from a serving base station to a target base station, or indeed when the device performs network re-entry when coming out of its idle mode, and during location update. In such scenarios ranging signalling arises during which the device attempts to acquire correct timing offset and power adjustment values.

In returning its ranging response signal, the base station uses an initial ranging Connection Identifier (CID) common to all potential WiMAX devices such that each device has to decode each Media Access Control (MAC) Packet Data Unit (MPDU) even though the vast majority of such MPDUs will not be intended for, or be useful to, that particular device. This leads to various inefficiencies having regard in particular to speed of operation and power usage.

SUMMARY OF INVENTION

The present invention seeks to provide for a microwave radio communications user device, related base station device, and related methods of operation and network arrangement having advantages over known such devices, methods and network arrangements.

In particular, the present invention seeks to address the inefficiencies that arise through the unnecessary decoding of downlink bursts during initial ranging within a WiMAX system.

According to one aspect of the present invention there is provided a microwave radio communications device arranged for communication with a base station and for receiving and decoding an MPDU for use in initial ranging signalling with said base station, the device being further arranged to retrieve data in a downlink-sub-frame from the base station serving to discriminate between MPDUs intended for different user devices.

Preferably, the device can be arranged for retrieving said data from within a field within the downlink-map of said sub-frame.

Said downlink sub-frame can include a flag serving to indicate whether a downlink burst contains ranging response PDUs.

In one embodiment, the device is arranged for retrieving said data as associated with a generic MAC header, wherein for example a reserve bit of the generic MAC header serves to discriminate between the MPDUs for different communication devices.

Alternatively, or in addition, a combination of bits can be employed within the generic MAC header to indicate the presence of an initial ranging sub-header.

The combination of bits is located within a Type field of the generic MAC header.

Yet further, said data can be provided within an initial ranging sub-header, and which can be arranged to follow on from the generic MAC header.

If present, the initial ranging sub-header can be decoded to assist with MPDU discrimination.

The device can be arranged to discriminate between different MPDUs and devices on the basis of MAC address details, or on the basis of handover identifiers, or at the time of location update.

As will be appreciated, the device can comprise one of a WiMAX user device, mobile station, customer premises device or subscriber station.

According to another aspect of the present invention there is provided a microwave radio communications base station device for communication with the user device and arranged to transmit MPDU for receipt and decoding by said user device for use in initial ranging signalling, the base station further being arranged to transmit data in a downlink sub-frame serving to discriminate between MPDUs intended for different user devices.

The provision of said data can of course be as defined above in relation to the microwave radio communication devices.

According to yet another aspect of the present invention there is provided a method of controlling selective decoding of MPDUs in signalling transmitted from a base station to a microwave radio communications device, and including the steps of: retrieving data in a downlink sub-frame serving to discriminate between MPDUs intended for different user communication devices.

Of course the method can include steps in relation to the provision of said data as defined above.

It should of course also be appreciated that the invention can provide for a microwave radio telecommunications system including the communications device as defined above.

According to still another aspect of the present invention, there is provided a downlink signal transmitted from a microwave radio communications device for use in initial ranging and decoding of MPDUs, said signal including data serving to discriminate between MPDUs intended for different user devices.

Again, the signal can be provided in the manner defined above with reference to the communication device.

The invention therefore also encompasses a microwave radio telecommunications system arranged to employ the signal as defined above.

The data handling and retrieval functionality of the present invention can be provided in either hardware or software and so the invention can also comprise a computer program product including computer program instructions which, when loaded within a processing device, are arranged to provide the method of operation as defined above.

BRIEF DESCRIPTION OF DRAWINGS

The invention is described further hereinafter, by way of example only, with reference to the accompanying drawings in which.

DESCRIPTION OF EMBODIMENTS

At the time of switch-on of a WiMAX device (for example, WiMAX CPE (Customer Premises Equipment)/SS (Subscriber station) or WiMAX MS (Mobile Station)), the device scans the Down Link (DL) channel in the operational frequency band. Once the preamble of the DL sub-frame is detected, the device attempts to acquire Downlink Map (DL-MAP) and Downlink Channel Descriptor (DCD) messages. After obtaining Up Link (UL) parameters, the WiMAX device sends a Ranging Request (RNG-REQ) message containing its unique MAC Address in an Initial Ranging CID for acquiring the correct timing offset and power adjustments. The value of Initial Ranging CID is zero (0). Once the Base Station (BS) has successfully received the RNG-REQ, it returns a Ranging Response (RNG-RSP) message containing the MAC Address of the device also by way of the Initial Ranging CID.

In another scenario, such as when the device performs a handover from a Serving BS to a Target BS, then after obtaining UL opportunities from the Target BS, the device transmits a RNG-REG message containing Handover Identity (HO_ID) or MAC address. As with the previous scenario, once the BS has successfully received the RNG-REQ message, it returns a RNG-RSP message containing the HO_ID of the device by way of the Initial Ranging CID.

Initial Ranging can also occur during network re-entry when the device comes out of its idle mode and also during location update.

As will be appreciated, the invention provides for improved Initial Ranging within, for example, a WiMAX user device. The invention allows for power savings and also serves to prevent unnecessary decoding of DL MPDUs during Initial Ranging procedure.

In further detail, after transmitting the RNG-REQ on Initial Ranging CID, WiMAX device waits for the RNG-RSP message on Initial Ranging CID. However, the WiMAX user device has to decode each MPDU transmitted on Initial Ranging CID in each downlink burst since the Initial Ranging CID is designed to be common to all devices. Such decoding continues until the device finally detects its own MAC Address, or assigned HO_ID, in the RNG-RSP portion of the MPDU. This unnecessary decoding disadvantageously affects the efficiency of the device.

Also, the decoding of the MPDUs in the DL bursts during Initial Ranging also results in unnecessary power consumption so as to lead to power wastage and thus a limiting effect on battery life.

Figure 1:
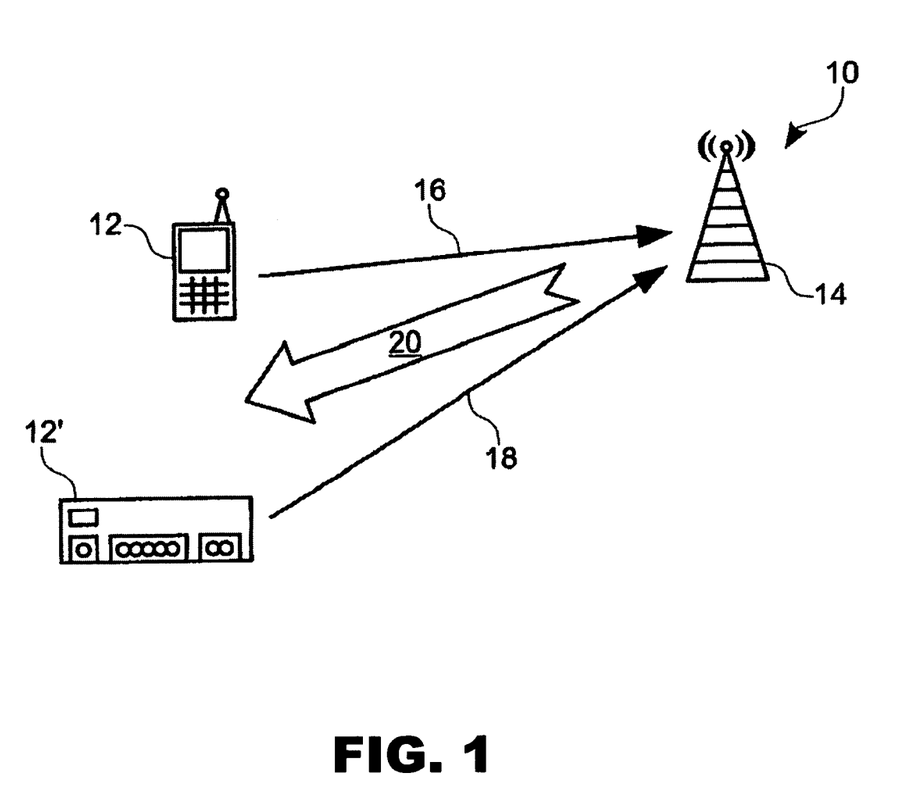
FIG. 1 is a schematic plan diagram of a WiMAX communications system within which the present invention can be employed.

Turning now to FIG. 1, there is illustrated a WiMAX communications system 10 including user devices comprising a WiMAX MS 12 and WiMAX CPE 12' and which are arranged for communication with a WiMAX base station 14 as required. As part of the connection procedure, each of the devices 12, 12' issues a ranging request signal 16, 18 respectively which, upon receipt at the base, station 14, initiates transmission of a ranging response in DL sub-frame 20 as illustrated in FIG. 1, and the structure of which is discussed further with reference to FIG. 2.

Figure 2:
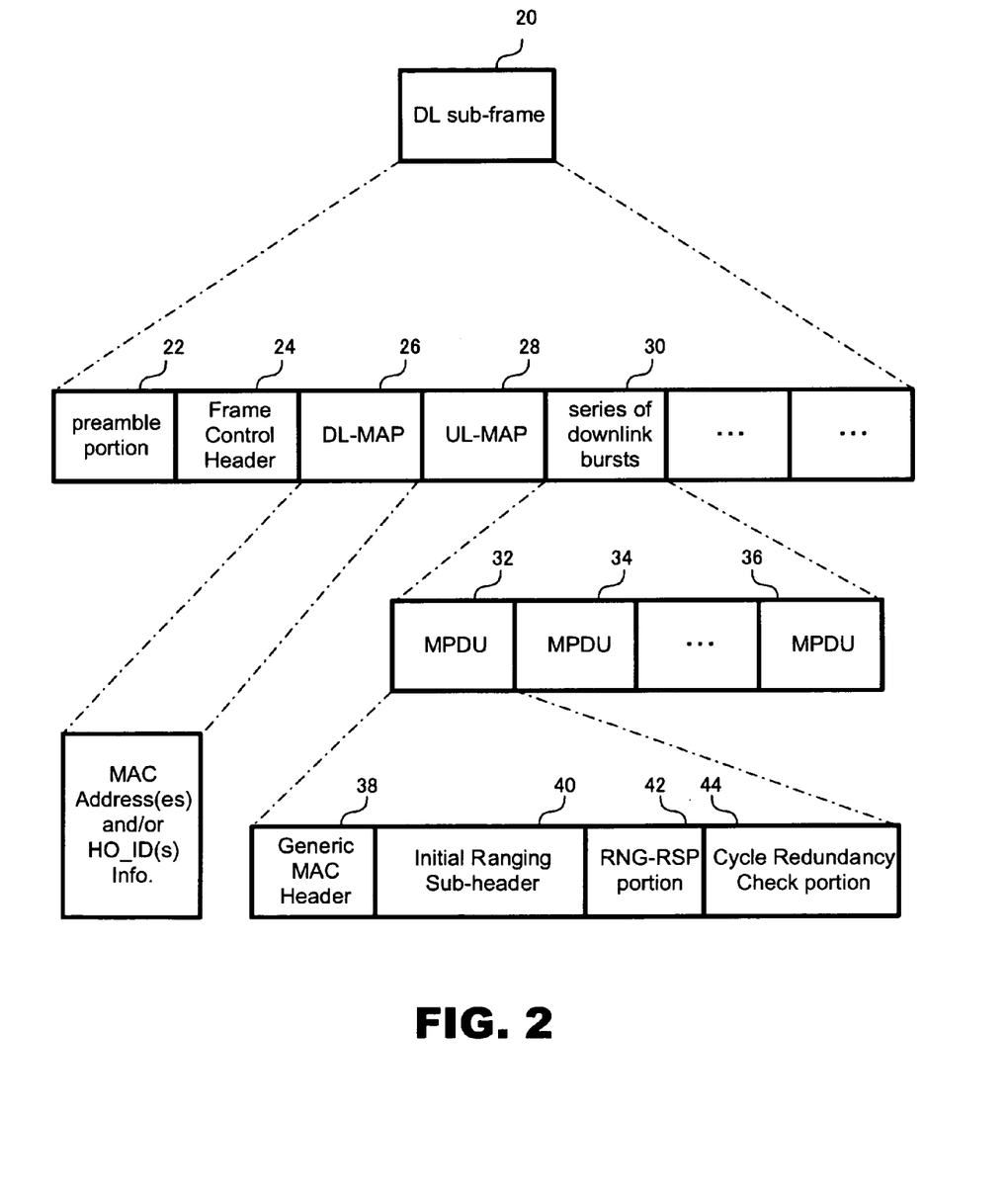
FIG. 2 is a block diagram of a downlink signal sub-frame structure illustrating aspects of the present invention.

FIG. 2 illustrates the general structure of the DL sub-frame 20 which comprises a preamble portion 22, Frame Control Header 24, DL-MAP 26, UL-MAP 28 and a series of downlink bursts 30.

In further detail, and of particular relevance to the present invention, the DL-MAP 26 can include the MAC addresses and/or HO_ID for each potential user devices.

Yet further, each downlink burst 30 comprises a selection of MPDUs 32-36 one of which is shown in greater detail as including a Generic MAC Header (GMH) 38, an Initial Ranging Sub-header 40 in addition to RNG-RSP portion 42 and Cycle Redundancy Check portion 44.

Figure 3:
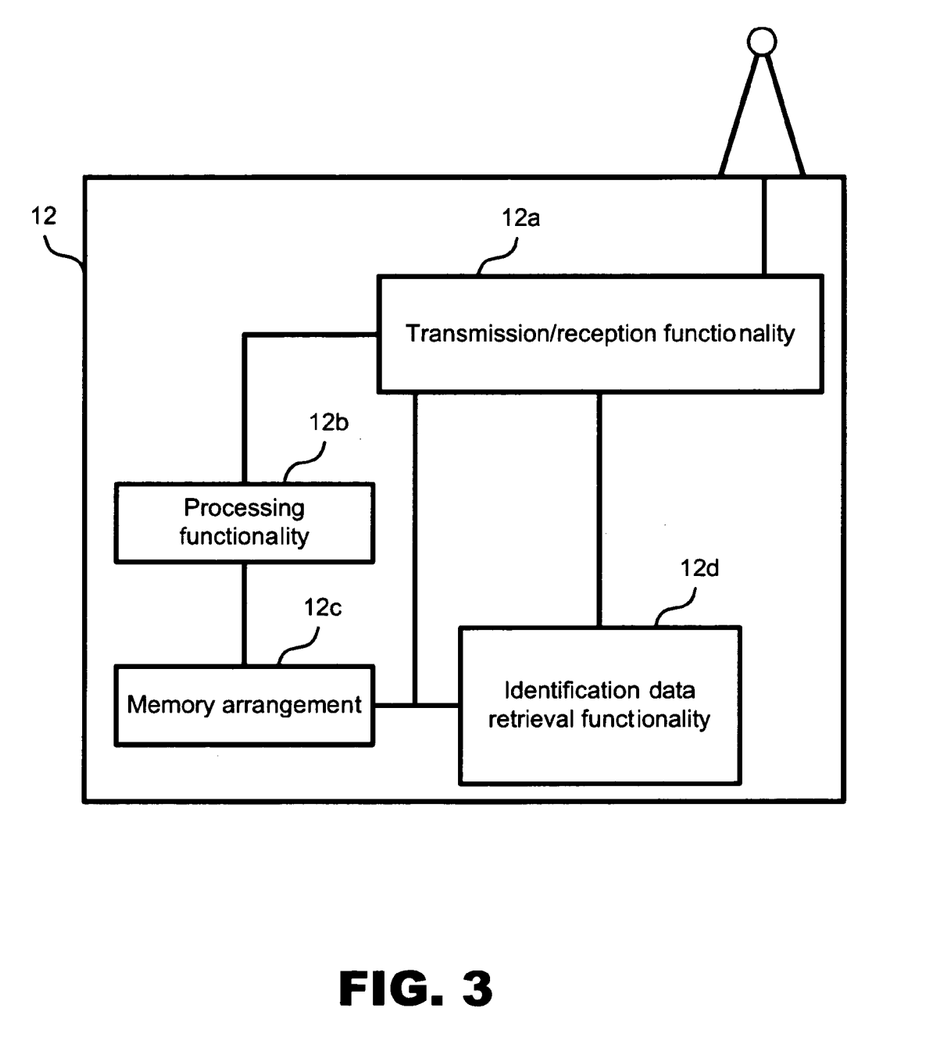
FIG. 3 is a block schematic diagram of a WiMAX user device in the form of a mobile phone handset according to an embodiment of the present invention.
Figure 4:
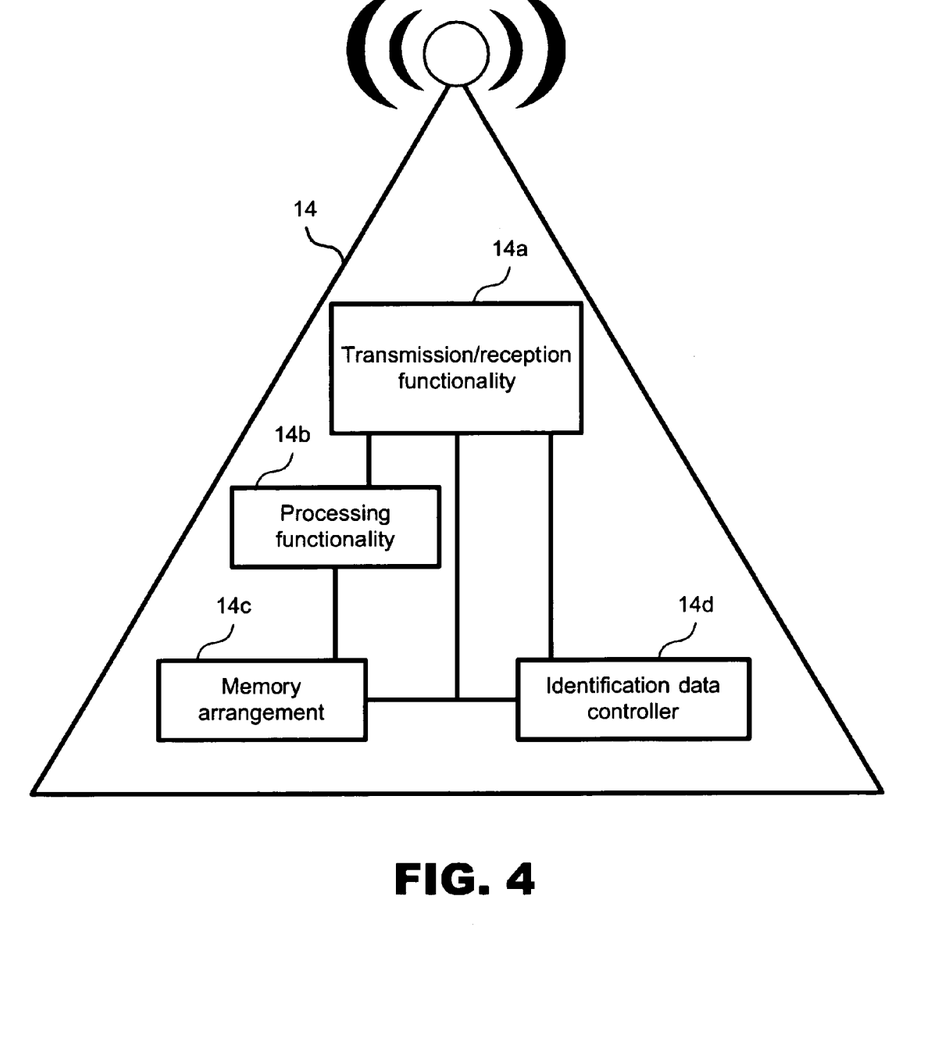
FIG. 4 is a schematic representation of a WiMAX base station according to an embodiment of the present invention.

Schematic block diagrams of the WiMAX user device 12 and base station 14 of FIG. 1 are provided by FIGS. 3 and 4 respectively.

Turning first to FIG. 3, there is illustrated a mobile phone handset 12 with standard transmission/reception functionality 12a, processing functionality 12b and memory arrangement 12c. The standard transmission/reception functionality 12a transmits and receives the signals to and from the base station through an antenna. The processing functionality 12b comprises a CPU (Central Processing Unit) and the like, and controls the general operation of the handset 12 according to various programs stored in the memory arrangement 12c. The memory arrangement 12c is configured to have a ROM and RAM. Programs for realizing the embodiment according to operational procedures illustrated in FIGS. 5-8 to be described later are stored in a program area in the memory arrangement 12c. In accordance with the invention the device also includes identification data retrieval functionality 12d which seeks to identify the MPDU transmitted from the base station 14 and which is specifically intended for the handset 12.

Likewise turning to FIG. 4, there is provided a schematic diagram of a WiMAX base station 14 such as that illustrated in FIG. 1 and which includes transmission/reception functionality 14a processing functionality 14b, memory arrangement 14c and, in accordance with the present invention, identification data controller 14d. The transmission/reception functionality 14a transmits and receives the signals to and from the handset 12 or the CEP 12' through an antenna. The processing functionality 14b comprises a CPU and the like, and controls the general operation of the WiMAX base station 14 according to various programs stored in the memory arrangement 14c. The memory arrangement 14c has a program area and a data area. The program area stores a management program for managing the handset 12 or the CEP 12'. The data area stores, for example, a table which associates the telephone number of each devices 12, 12', a email address, positional information and a knowledge about which the target BS the devices 12, 12 can be registered to. The data controller 14d serves to establish identification data within the DL sub-frame 20 transmitted to the handset 12 or CEP 12'.

According to one aspect of the present invention, the RNG-RSP message is appended to a GMH 38 which is adapted for discrimination between different MPDUs.

A structure of the adapted GMH 38 is illustrated by the following table.

| HT (1 bit) | EC (1 bit) | Type (6 bits) | ESF (1 bit) | CI (1 bit) | EKS (2 bits) | RSV (1 bit) | LEN (3 bits) |
|---|---|---|---|---|---|---|---|
| | LEN (8 bits) | | | | CID (8 bits) | | |
| | CID (8 bits) | | | | HCS (8 bits) | | |

While the Reserve (RSV) bit is generally unused, this aspect of the invention proposes to use this bit to identify for example whether MAC Address or HO_ID is even or odd in the appended RNG-RSP message.

Rules are set such that the RSV bit=0 if MAC Address or HO_ID is even number, and the RSV bit=1 if MAC Address or HO_ID is odd number.

As noted previously, for RNG-RSP, the value of CID will be 0 (zero) and so when the WiMAX device detects a zero value of CID, it checks for the RSV bit. Responsive to the value of the RSV bit, the WiMAX user device can detect whether the RNG-RSP is intended for device whose MAC Address or HO_ID is even or odd. If RSV bit matches with the even/odd indication of the MAC Address or HO_ID of the particular device 12, 12' then the device will decode the RNG-RSP PDU of the MPDU. It is possible to discriminate between RNG-RSP PDUs for the devices with even/odd MAC Address or HO_ID by use of the RSV bit. Thus, with this aspect of the present invention, the likelihood of unnecessary decoding of RNG-RSP PDUs can be reduced by half.

Figure 5:
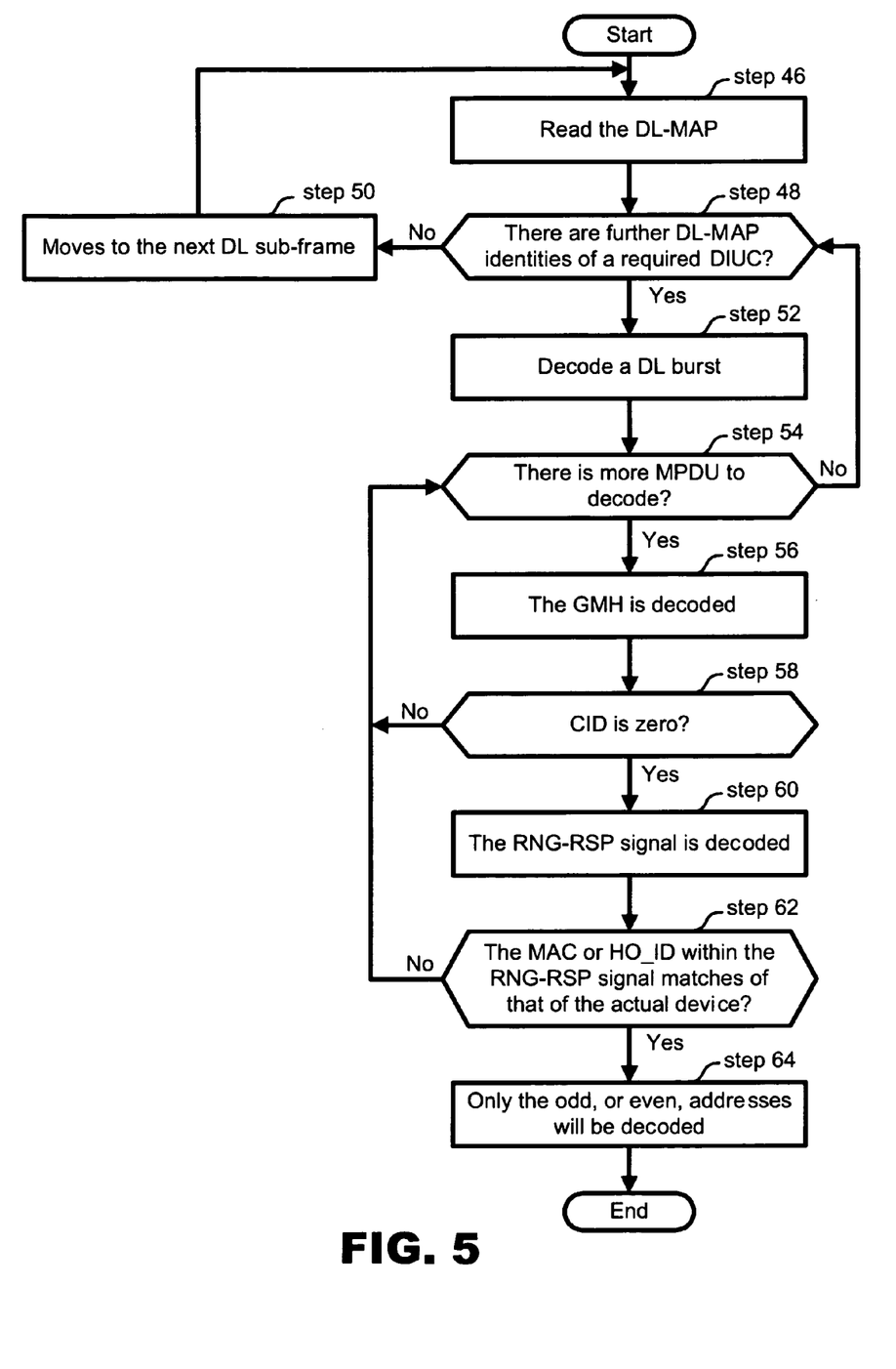
FIG. 5 is a flow diagram illustrating operation within a WiMAX device such as that of FIG. 3 in accordance with one aspect of the present invention.

Turning now to FIG. 5, there is provided a flow diagram providing a further illustration of the first embodiment of the present invention as described above.

The user device 12 is arranged to receive the DL sub-frame 20 in response to it issuing its RNG-REQ signal 16 and as a first step reads the DL-MAP 26 at step 46 and ascertains whether there are further DL-MAP identities of a required Down Link Internal Usage Code (DIUC) at step 48. If not, the device moves to the next DL sub-frame as received and as indicated at step 50. However, if further DL-MAP identifiers are required, such as indicated at step 48, then the device moves to decode a DL burst as indicated at step 52. If it is determined that there is more MPDU to decode at step 54 then the procedure continues to step 56 at which the GMH is decoded. If not, then the procedure returns to step 48 for determination of whether more DL-MAP identifiers are required.

In decoding the GMH after step 56, it is first determined whether the Connection Identifier (CID) is zero so as to indicate the presence of the RNG-RSP signal at step 58. The value of the RSV bit is then determined so as to identify whether an odd or even MAC address, or HO_ID will be relevant for this particular RNG-RSP signal. If the value of CID is zero, and the particular address or identification of the device either odd or even as required, the RNG-RSP signal is decoded at step 60 and it is subsequently determined at step 62 whether the MAC or HO_ID within the RNG-RSP signal matches that of the actual device. As appropriate, only the odd, or even, addresses will be decoded so as to reduce the unnecessary signalling overheader, or power consumption, by 50% (step 64).

If such a match arises, then the communication between the device and the base station can continue as appropriate for decoding and subsequent signalling processing.

According to another embodiment, the RNG-RSP message can be appended to the GMH in the manner illustrated below.

| HT (1 bit) | EC (1 bit) | Type (6 bits) | ESF (1 bit) | CI (1 bit) | EKS (2 bits) | RSV (1 bit) | LEN (3 bits) |
|---|---|---|---|---|---|---|---|
| | LEN (8 bits) | | | | CID (8 bits) | | |
| | CID (8 bits) | | | | HCS (8 bits) | | |

In the Type field, Bit #1 has a designation of 1="Present", 0="Absent" and represents whether a Packing sub-header is present or not. Bit #2 has a designation of 1="Present", 0="Absent" and represents whether a Fragmentation sub-header is present or not. Both Packing and Fragmentation sub-headers are mutually exclusive and are not present within same MPDU.

In addition to employing data represented by the presence of the Type Bits #1 and #2 as discussed below, this embodiment also includes a new "Initial Ranging Sub-header" which is arranged to follow immediately the GMH and which will be present when both the bits Bit #1 and Bit #2 are set to 1. The format of the Initial Ranging Sub-header can be as follows:

| Syntax | Size (bit) | Notes |
|---|---|---|
| Initial Ranging Sub-header( ) { | | |
| HO_MACADD_ID | 1 | 0: MAC Address |
| | | 1: HO_ID |
| If(MAC Address) { | | |
| MAC Address | 48 | MAC Address of device |
| } | | |
| Else { | | |
| HO_ID | 8 | HO_ID |
| } | | |
| Reserved | 7 | Shall be set to zero. |
| } | | |

As above, with a RNG-RSP message, the value of CID will be 0 (zero). Once the WiMAX user device detects a zero value for the CID in the GMH, it checks for the Bit #1 and Bit #2 values of the Type field. If both of these bits are set to 1, then the device will decode the "Initial Ranging Sub-header". Only if the MAC Address or HO_ID matches with the device's MAC Address or assigned HO_ID, will the device decode the RNG-RSP PDU.

As will be appreciated, this second embodiment of the invention serves to discriminate RNG-RSP PDUs of the MPDU for the different devices and thus to save the decoding of unnecessary RNG-RSP PDUs which are not intended for that particular user device.

Figure 6:
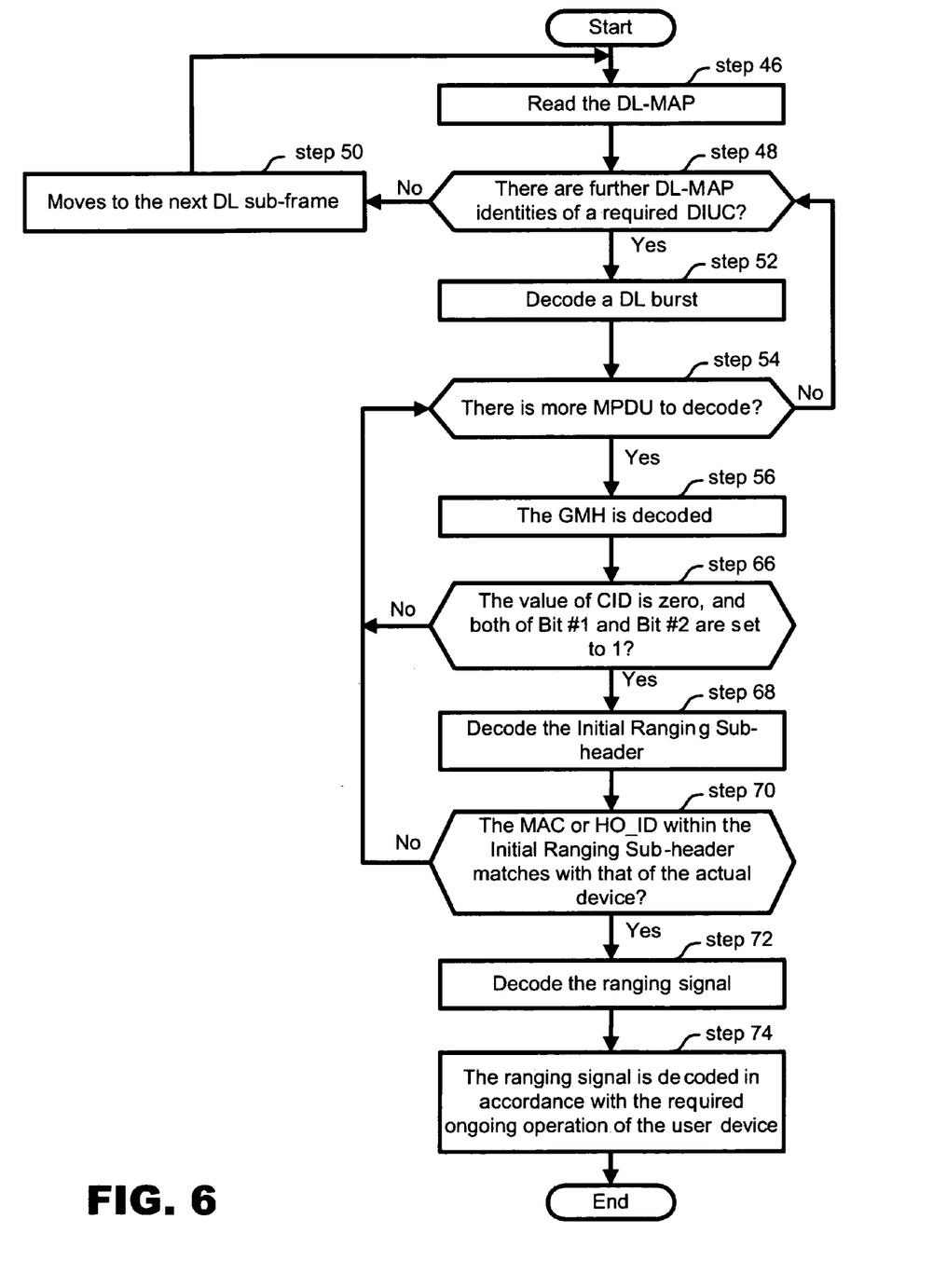
FIG. 6 is a flow diagram illustrating operation within a WiMAX device such as that of FIG. 3 in accordance with another aspect of the present invention.

Turning now to FIG. 6, there is provided a flow-diagram illustrating operation within a user device in accordance with this second embodiment of the present invention.

As before, the user device 12 is arranged to receive the downlink sub-frame 20 in response to it issuing its RNG-REQ signal 16 and, as a first step reads the DL-MAP 26 at step 46 and ascertains whether there are further DL-MAP identities of the required DIUC at step 48. If not, the device moves to the next DL sub-frame as received and as indicated at step 50. However, if further DL-MAP identifiers are required such as indicated at step 48, then the device moves to decode a downlink burst as indicated at step 52. If it is determined that there is more MPDU to decode at step 54 then the procedure continues to step 56 at which the GMH is decoded. If not, then the procedure returns to step 48 for determination of whether more DL-MAP identifiers are required.

If, during decoding of the GMH at step 56, it is determined that at step 66 the value of CID is zero and that both of Bit #1 and Bit #2 are set to 1, then decoding of the Initial Ranging Sub-header, such as illustrated at step 68 occurs and it is determined whether or not the MAC or handover identifier within the initial ranging sub-header matches with that of the actual device at step 70. If there is a match, then, as illustrated at step 72, decoding of the ranging signal continues and, as before, the procedure moves on to the next step and is decoded at step 74 in accordance with the required ongoing operation of the user device. If however at either of steps 66 or 70 it is determined that at least one or more of Bits #1 or #2 of the Type field is not set to 1, or there is no match between the MAC address and HO_ID and that of the device, then the procedure returns to step 54 where it is determined whether or not there are more MPDUs to decode. If such a match arises, then the communication between the device and the base station can continue as appropriate.

A yet further embodiment of the present invention is based upon the feature that a communication scheme such as WiMAX supports Time Division Duplex (TDD) in which a frame is divided into two parts: DL sub-frame and UL sub-frame. In the DL sub-frame, the DL-MAP is broadcast by the Base Station and it represents the location of each DL burst in the DL sub-frame by DL_MAP-IE( ).

According to this embodiment however, changes are proposed for DL_MAP-IE( ) so that the user device can determine whether the RNG-RSP MPDU in the downlink burst is intended for it.

In addition to the other fields already existing in the DL_MAP-IE( ), the following field can be included according to this embodiment of the invention.

Address(es) or HO_ID(s) of devices whose RNG-RSP PDU is included in the downlink burst.

As will be appreciated, this embodiment of the invention serves to discriminate RNG-RSP PDUs of the MPDUs for the different devices and thus advantageously avoids the decoding of downlink bursts containing RNG-RSP PDUs which are not intended for that particular user device.

Figure 7:
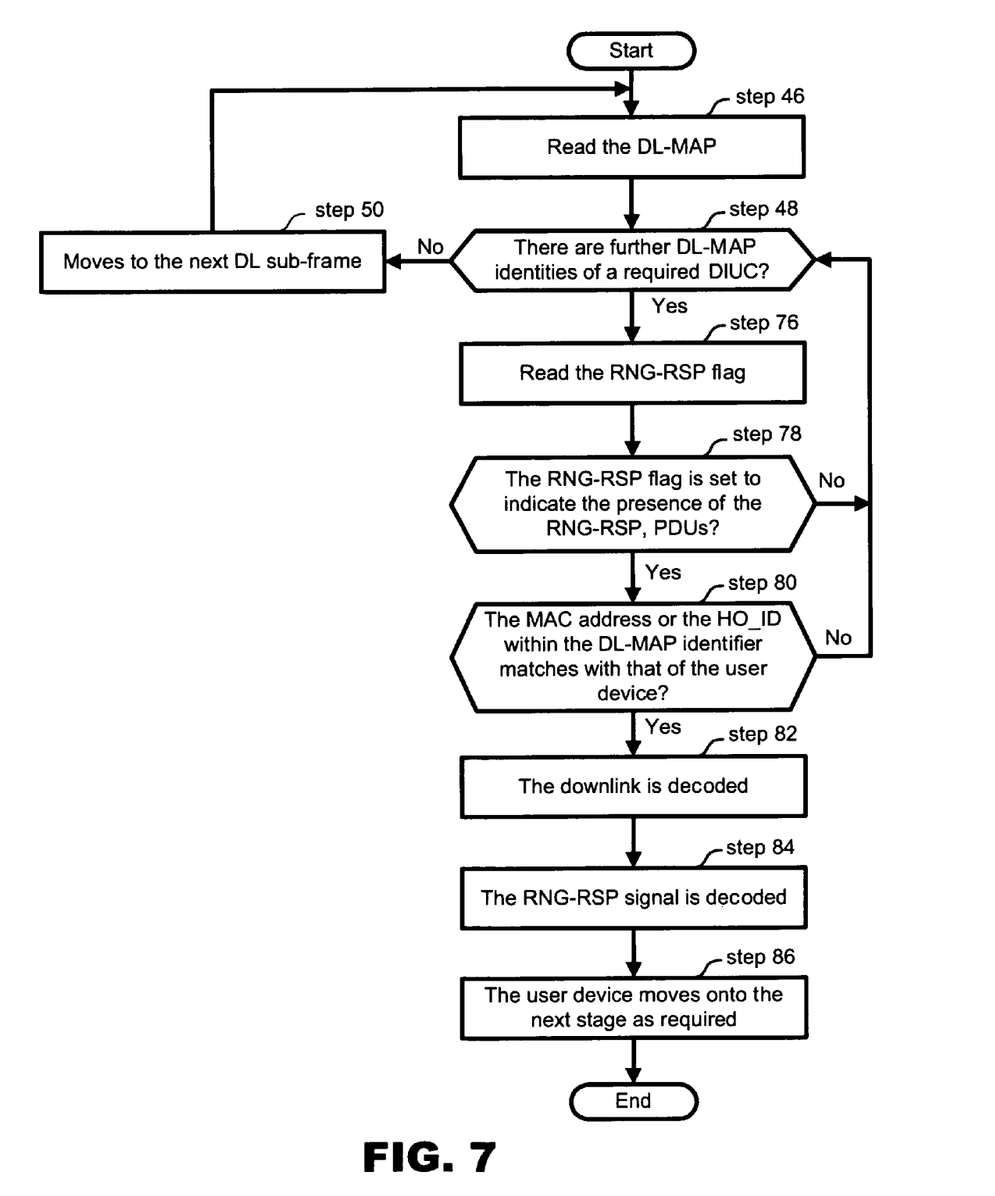
FIG. 7 is a flow diagram illustrating operation within a WiMAX device such as that of FIG. 3 in accordance with a further aspect of the present invention.

Turning now to FIG. 7, there is provided a flow-diagram illustrating operation within a user device in accordance with this yet further embodiment of the present invention.

Again, the user device 12 is arranged to receive the DL sub-frame 20 in response to it issuing its RNG-REQ signal 16 and as a first step reads the DL-MAP 26 at step 46 and ascertains whether there are further DL-MAP identities of the required DIUC at step 48. If yes, the device moves to step 76 and then step 78 where it is determined whether or not the RNG-RSP flag is set to indicate the presence of the RNG-RSP, PDUs. If so, it is determined at step 80 whether the MAC address or the handover identifier within the DL-MAP identifier matches with that of the user device. If a match occurs, then the downlink is decoded at step 82, and subsequently, at step 84, the RNG-RSP signal is decoded prior to the operation of the user device moving onto the next stage as required as illustrated at step 86.

If, however, at either of step 78 or 80 it is determined that the RNG-RSP flag is not set, or the relative identification values do not match, then the process turns to step 48 as indicated.

Another arrangement of the present invention can comprise a combination of the three aspects noted above. The WiMAX device will first check the RNG_RSP_FLAG information in DL_MAP-IE( ). If downlink burst contains RNG-RSP PDU (s), then device will check whether HO_MAC-

| Syntax | Size (bit) | Notes |
|---|---|---|
| DL_MAP-IE( ) { | | |
| RNG_RSP_FLAG | 1 | 1: Downlink burst contains RNG-RSP PDU(s) |
| | | 0: No RNG-RSP PDU is present. |
| If(RNG_RSP_FLAG == 1) { | | |
| HO_MACADD_Information ( ) | variable | Represents MAC Address or HO_ID. |
| } | | |
| Reserved | 7 | Shall be set to zero. |
| HO_MACADD_Information ( ) { | | |
| N_RNG_RSP_MAC_Address | 8 | Number of RNG-RSP PDUs assigned in this downlink burst corresponding to MAC Address in RNG-REQ. |
| For (i=0; i< N_RNG_RSP_MAC_Address; i++){ | | |
| MAC Address | 48 | MAC Address |
| } | | |
| N_RNG_RSP_HO_ID | 8 | Number of RNG-RSP PDUs assigned in this downlink burst corresponding to HO_ID in RNG-REQ. |
| For (i=0; i< N_RNG_RSP_HO_ID; i++) { | | |
| HO_ID | 8 | Handover identity |
| } | | |
| } | | |

60

The RNG_RSP_FLAG serves to indicate whether downlink burst contains any RNG-RSP PDU(s) on Initial Ranging CID or not. If RNG_RSP_FLAG is equal to 1, then HO_MACADD_Information is included in the DL_MAP-IE( ). HO_MACADD_Information indicates MAC ADD information contains its MAC Address or HO_ID. If yes, then device will decode the burst. After decoding downlink burst, on CID=0 when the RSV bit of GMH of RNG-RSP PDU matches with the even/odd indication of the user's MAC address or HO_ID, then device looks into Type field, other wise device will decode other MPDU in the burst. Based on the Type filed, device will decode the Initial Ranging Sub-header, if required.

Figure 8:
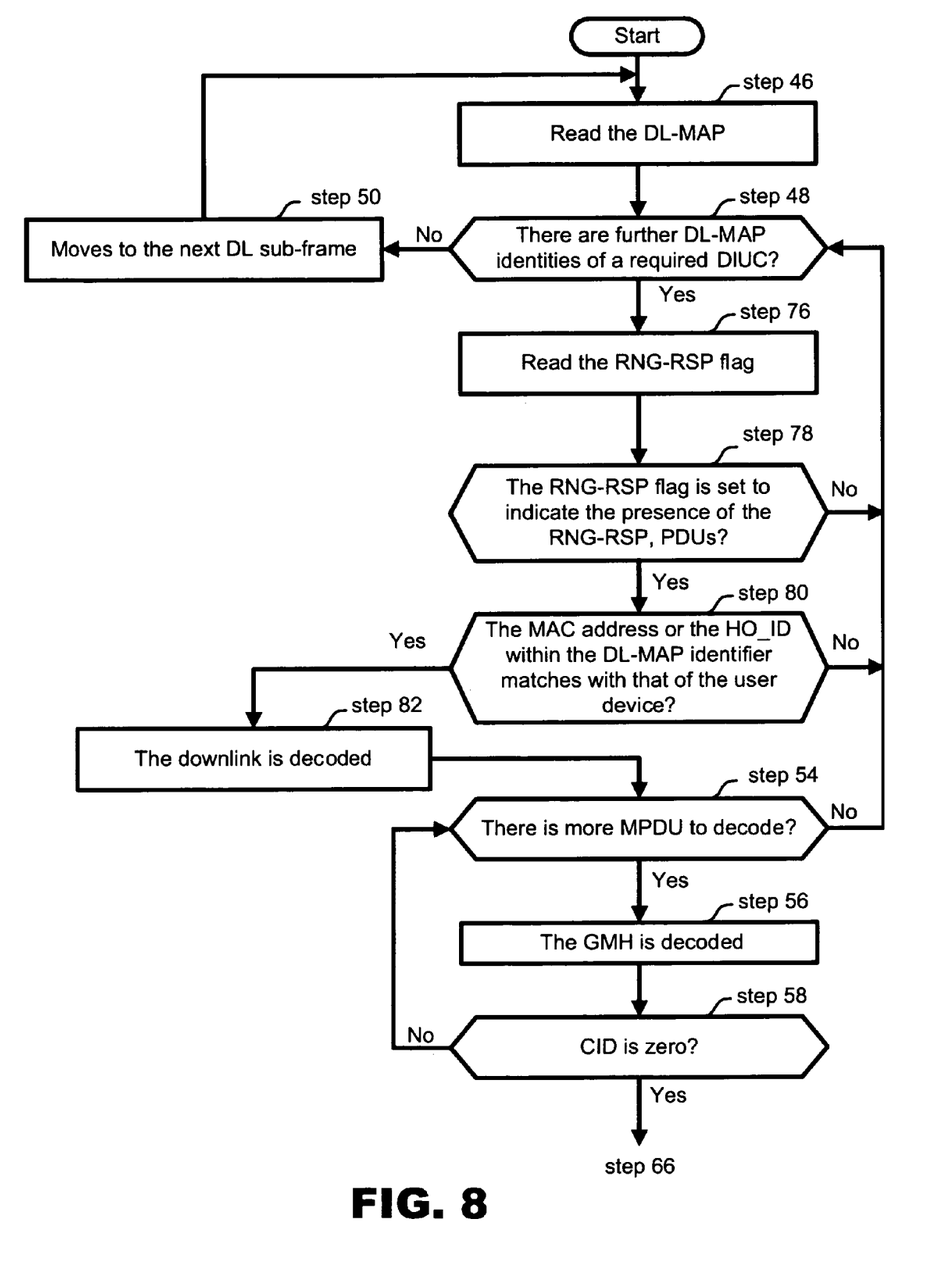
FIGS. 8 and 9 are flow diagrams illustrating operation within a WiMAX device such as that of FIG. 3 in accordance with a combination of the steps illustrated with reference to FIGS. 5-7.
Figure 9:
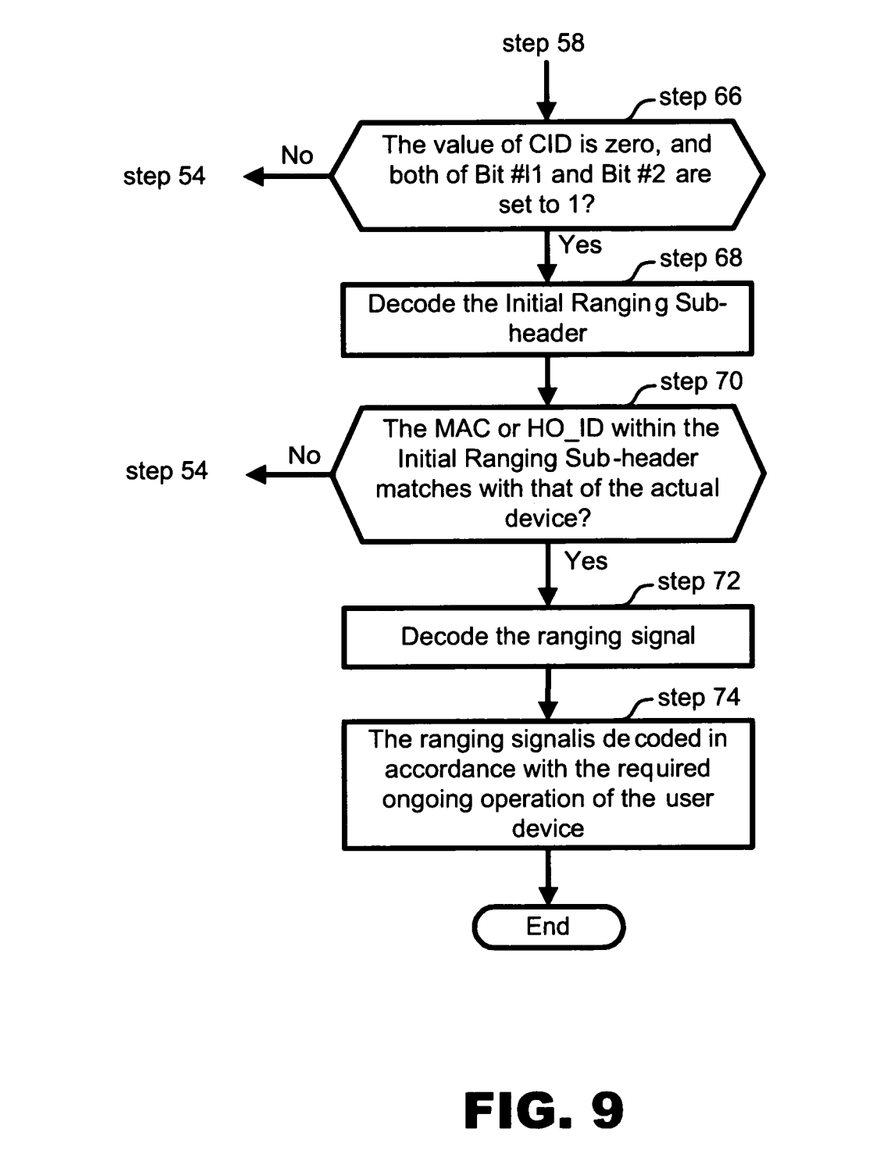

Turning now to FIGS. 8 and 9, there is provided a flow-diagram illustrating the aforementioned yet further embodiment of the present invention and which comprises a combination of the previously mentioned three embodiments. As will be appreciated from the reference numerals employed within the flow-diagram of FIGS. 8 and 9 which correspond to the respective sets of reference numerals of FIGS. 5-7, the details of the embodiment of FIG. 7 precedes that of FIG. 5 which in turn precedes that of FIG. 6, and so as to employ, in order, the RNG-RSP flag of FIG. 7, and the RSV bit of FIG. 5 and the Bits #1 and #2 of the Type field of FIG. 6 so as to arrive at the decoding of step 72 as indicated.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

Furthermore, the present application claims priority based on UK Patent Application No. 0809402.1 filed on May 23, 2008, the entire contents of which are incorporated herein by reference.

INDUSTRIAL APPLICABILITY

This invention is applicable to, for example, the communications device and system.

The invention claimed is:

1. A microwave radio communications device arranged for communication with a base station and for receiving and decoding an MPDU (Mac (Media Access Control) Protocol Data Unit) for use in initial ranging signalling with said base station, wherein
the microwave radio communications device is further arranged to retrieve data in a downlink-sub-frame from the base station serving to discriminate between MPDUs intended for different user devices, and
the microwave radio communications device includes a processor that decodes the MPDU when a parity of a bit included in the retrieved data indicates that the MPDU is intended for the microwave radio communications device, and does not decode the MPDU when the parity of the bit indicates that the MPDU is not intended for the microwave radio communications device.

2. The microwave radio communications device as claimed in claim 1, wherein the microwave radio communications device is further arranged for retrieving said data from within a field within a downlink-map (DL-MAP) of said downlink-sub-frame.

3. The microwave radio communications device as claimed in claim 1, wherein the downlink-sub-frame includes a flag serving to indicate whether a downlink burst contains ranging response PDUs.

4. The microwave radio communications device as claimed in claim 3, wherein the flag is provided within a DL-MAP portion of the downlink-sub-frame.

5. The microwave radio communications device as claimed in claim 1, wherein the microwave radio communications device is further arranged for retrieving said data as associated with a generic MAC header.

6. The microwave radio communications device as claimed in claim 5, wherein a reserve bit of the generic MAC header serves to discriminate between the MPDUs for different communication devices.

7. The microwave radio communications device as claimed in claim 5, wherein a combination of bits within the generic MAC header is arranged to indicate a presence of an initial ranging sub-header.

8. The microwave radio communications device as claimed in claim 7, wherein the combination of bits is located within a Type field of the generic MAC header.

9. The microwave radio communications device as claimed in claim 1, wherein said data is provided within an initial ranging sub-header.

10. The microwave radio communications device as claimed in claim 9, wherein said initial ranging sub-header is arranged to follow on from a generic MAC header.

11. The microwave radio communications device as claimed in claim 9, wherein the microwave radio communications device is further arranged to decode the initial ranging sub-header for MPDU discrimination.

12. The microwave radio communications device as claimed in claim 1, wherein the microwave radio communications device is further arranged to discriminate between different MPDUs and devices based on MAC address details.

13. The microwave radio communications device as claimed in claim 1, wherein the microwave radio communications device is further arranged to discriminate between different MPDUs and devices based on handover identifiers.

14. The microwave radio communications device as claimed in claim 1, wherein the microwave radio communications device is further arranged to discriminate between different MPDUs and devices at a time of ranging on an initial ranging CID (Connection Identifier).

15. The microwave radio communications device as claimed in claim 1, wherein the microwave radio communications device comprises one of a WiMAX user device, mobile station, customer premises device or subscriber station, and any WiMAX enabled device.

16. The microwave radio communications device as claimed in claim 1, wherein
in the initial ranging signaling with the base station, the microwave radio communications device sends a RNG-REQ (Ranging Request) message including a MAC (Media Access Control) address of the microwave radio communications device, the bit included in the retrieved data in the down-link sub-frame from the base station indicates whether an MPDU is intended for a device having a MAC address that is even or a device having a MAC address that is odd, and
if the MAC address of the microwave radio communications device has a value that does not coincide with the bit, then the microwave radio communications device does not decode the MPDU.

17. The microwave radio communications device as claimed in claim 1, wherein
in the initial ranging signaling with the base station, the microwave radio communications device sends a RNG-REQ (Ranging Request) message including an HO_ID (Handover Identity) of the microwave radio communications device,
the bit included in the retrieved data in the down-link sub-frame from the base station indicates whether an MPDU is intended for a device having an HO_ID that corresponds to the HO_ID of the microwave radio communications device, and if the HO_ID of the microwave radio communications device has a value that does not coincide with the HO_ID indicated by the bit, then the microwave radio communications device does not decode the MPDU.

18. A method comprising:

controlling selective decoding of MPDUs (Mac(Media Access Control) Protocol Data Unit) in signalling transmitted from a base station to a microwave radio communications device;

retrieving data in a downlink-sub-frame serving to discriminate between MPDUs intended for different user communication, devices; and decoding the MPDU when a parity of a bit included in the retrieved data indicates that the MPDU is intended for the microwave radio communications device, and not decoding the MPDU when the parity of the bit indicates that the MPDU is not intended for the microwave radio communications device.

19. A non-transitory recording media including a computer program product including computer program instructions which, when loaded within a processing device, is arranged to provide a method, the method comprising:

controlling selective decoding of MPDUs (Mac(Media Access Control) Protocol Data Unit) in signalling transmitted from a base station to a microwave radio communications device;

retrieving data in a downlink sub-frame serving to discriminate between MPDUs intended for different user communication devices; and decoding the MPDU when a parity of a bit included in the retrieved data indicates that the MPDU is intended for the microwave radio communications device, and not decoding the MPDU when the parity of the bit indicates that the MPDU is not intended for the microwave radio communications device.

* * * * *